United States Patent [19]

Guck

[11] Patent Number: 5,911,776
[45] Date of Patent: Jun. 15, 1999

[54] AUTOMATIC FORMAT CONVERSION SYSTEM AND PUBLISHING METHODOLOGY FOR MULTI-USER NETWORK

[75] Inventor: Randal Lee Guck, Dana Point, Calif.

[73] Assignee: Unisys Corporation, Blue Bell, Pa.

[21] Appl. No.: 08/768,387

[22] Filed: Dec. 18, 1996

[51] Int. Cl.$^6$ .................................................. G06F 17/30
[52] U.S. Cl. .......................... 709/217; 707/205; 707/104
[58] Field of Search .................................. 707/2, 104, 10, 707/522, 523, 200, 205; 395/200.01, 500, 200.47, 200.49

[56] References Cited

U.S. PATENT DOCUMENTS

| | | | |
|---|---|---|---|
| 4,831,581 | 5/1989 | Miller et al. | 711/126 |
| 4,951,196 | 8/1990 | Jackson | 705/37 |
| 5,054,096 | 10/1991 | Beizer | 382/305 |
| 5,119,465 | 6/1992 | Jack et al. | 395/500 |
| 5,608,874 | 3/1997 | Ogawa et al. | 395/200.76 |

*Primary Examiner*—Dung C. Dinh
*Attorney, Agent, or Firm*—Alfred W. Kozak; Mark T. Starr; Steven R. Petersen

[57] ABSTRACT

A network providing a server using an object-database enables an author to create and store an original document, as a source file with a first format. Software in the data base will provide multiple sets of shadow file-converter groups connected to the source file of the original document. Each shadow file-converter set enables the transformation of the original source file format into a particular other specific type of format. Any client or user of the network can access and receive a copy of the original source document which is automatically reformatted to match the requirements of the receiver's appliance. Thus, one original source document can be created and then published in any specific format to multiple numbers of and type of receiving appliances.

6 Claims, 10 Drawing Sheets

AUTOMATIC FORMAT CONVERSION SYSTEM AND PUBLISHING METHODOLOGY FOR MULTI-USER NETWORK

CROSS REFERENCES TO RELATED APPLICATIONS

This application relates to the following applications which are incorporated herein by reference:

U.S. Ser. No. 08/768,386 entitled "Selective Multiple Protocol Transport and Dynamic Format Conversion in a Multi-User Network" now U.S. Pat. No. 5,830,433;

U.S. Ser. No. 08/769,199 entitled "A Method for Storing/Retrieving Files of Various Formats in an Object Database Using a Virtual Multimedia File System" now U.S. Pat. No. 5,864,870; and U.S. Ser. No. 08/769,200 entitled "A Method For Abstracting Messages of Various Protocols." Into Objects For Storage In A Database. This application Aug. 11, 1998 as U.S. Pat. No. 5,794,039.

FIELD OF THE INVENTION

This disclosure relates to automatic systems and methods for efficiently enabling the text or graphics created by an author to be converted to other formats suitable for other client users and also for telephone receipt, fax receipt or interactive voice and mail receipt without the need for laborious steps for each type of format conversion required from the original author's text or graphics.

BACKGROUND OF THE INVENTION

In the rapidly developing area of digital technology, there is an expanding use of networks with multi-client users which can be connected to the multitudinous terminals of the Internet or to the limited number of terminals in an Intranet set-up for a particular group or set of clients.

Such type of networks with multiple numbers of connected clients present many problems in that many of the client stations are limited to particular types of content format protocol delivery. Further, when it is desired to communicate with FAX machines and telephones, in addition to E-Mail, again, there are specialized formats and protocols that are required to enable these types of communications to take place with these specialized appliances or terminals.

It has become more and more desirable to provide systems and methodology which enable clients using one type of personal computer and its specialized protocol requirements to communicate with other clients having different personal computers with different formats and protocol requirements. Likewise, it is desirable to enable a user client's personal computer, using one type of protocol, to be able to communicate with FAX machines, telephones and E-Mail clients, which require different content formats and different protocols for communication delivery.

Earlier network technologies and even the majority of present network technologies involve slow and complex software systems and methods in order to enable a client having a document in one particular format, and using a particular protocol to communicate with another client terminal having a different protocol or with terminals having the protocols and formats used for the FAX machine or the protocols used for the telephone. These often involve long, drawn-out translation procedures which were slow, cumbersome and subject to reliability problems.

It would be most desirable to provide a network where any client, no matter what format his document consists of, or what his personal computer protocol system utilizes, could create, originate or author a document and enable this document's content to be transmitted to and received by personal computer clients or appliances using different types of protocol so as to be received by appliances such as FAX machines, telephones and E-Mail users. Heretofore, this has not been done with any great efficiency whereby an originator or author could originate a text or message in his own personal format and using his personal appliance protocol, and send it to multiple receiver users and multiple receiver appliances without any further complications other than sending his text or message into the network after it has been automatically processed and handled by a server which distributes his origination in any and all formats necessary to be received by any of the receiving appliances using the compatible protocol. Such a system and methodology is now possible with the presently described system and methodology.

Thus, it is a most desirable result when there is provided software which handles and solves the problem of how to target and distribute information from a single source to many types of receiving appliances attached to a network without incurring any difficulties or problems involving the varied characteristics of each appliance.

Referring to FIG. 1, there is seen a flexible, multi-user network system whereby a client-user is capable of authoring text, graphics, or messages which can be distributed to multiple receiver terminals regardless of the format and protocol requirements that these receiver terminal appliances are subject to.

As seen in FIG. 1, a client personal computer 10 which uses a Web Browser is connected to network 40 as is also the personal computer client 20 and the mail user client 30. This could also include a unit designated as the Com.Unity Browser in the personal computer client 33 which is a specialized unit described hereinafter.

As seen in FIG. 1, the client Personal Computer (PC) 10 uses the HTTP protocol (Hyper Text Transport Protocol). This is a client-server protocol used for information sharing on the Internet and is the basis of use for the World-Wide Web (WWW). The PC client 20 is seen to have a Web Browser using the FTP (File Transfer Protocol). This is a set of TCP/IP commands used to log onto a network, to list directories and to copy files. It can also be used for translation between ASCII and the EBCDIC. ASCII denotes "American Standard Code for Information Exchange". It involves a binary code for text, as well as for communication and printer control. It is used for most communications and is the built-in character code of most mini-computers and personal computers. ASCII is a 7-bit code providing 128 character combinations. EBCDIC indicates "Extended Binary Coded Decimal Interchange Code". This is an 8-bit code having 256 combinations that stores one alpha-numeric character or two decimal digits in one byte. This binary code is used for text, for communications, and printer control.

The Mail User Client 30 is seen to use the SMTP protocol which denotes Simple Mail Transfer Protocol. This is a messaging protocol used by software applications to send E-Mail to receiving terminals.

A further client shown in FIG. 1 is a News Network User Client which carries information using NNTP protocol (News Network Transfer Protocol), which is a client-server based TCP/IP protocol.

As seen in FIG. 1, the Network 40 is connected for communication to the Server 50. The Server operates as a computer in a network shared by multiple users. It can act as a file server whereby it uses a high-speed computer to store the programs and store the data files which are shared by the various users on the network. Sometimes this is called a "network server", since it acts like a remote disk drive. The Server 50 can also act as a database server in that it is dedicated to database storage and retrieval.

The Server 50 is seen to provide a multiple number of server processes 52a, 52b, 52c . . . 52n, which provide programs which implement the operation of the Server 50.

Within the Server 50 is a database 58 which provides an electronically stored collection of data. The database 58 is managed by the database manager 54, which involves software that allows a user to manage multiple data files. In the present embodiment, the module 54 is a specialized database manager called OSMOS. OSMOS is a specialized system which is an object/relational database management system.

The OSMOS database manager 54 provides software that enables database management capability for traditional programming languages, such as COBOL, BASIC, and C and C++. It also enables the storage and retrieval of data from the database 58.

The operational functioning of the OSMOS database manager 54 is handled by the unit designated Schema 56, which defines the entire database. The Schema 56 sets up the organization of and the ways that the entire database 58 is used. A Methods Library 55 in FIG. 1 is called upon by the Object Manager in response to application operation invocations. The Method Library is user-written.

Further, as seen in FIG. 1, the Server software processes module 52 is connected to the Public Switched Telephone Network 60 (PSTN), which provides connection lines to the telephone 80 using the Interactive Voice Response protocol (IVR). This involves the generation of voice output by a computer. It provides pre-recorded information either with or without selection by the caller. Interactive Voice Response (IVR) also allows interactive manipulation of a database. The use of Audiotex is a voice response (IVR) application that allows users to enter and retrieve information over the telephone. In response to a voice menu, users press the keys or answer questions to select their way down a path of choices. It could be used for obtaining the latest financial quotes, as well as for ordering various products. It can also be built into interactive systems to allow databases to be changed. These interactive systems can use VIS where VIS denotes Voice Information Service, which involves a variety of voice processing service applications.

The FAX appliance 70 of FIG. 1 operates on a special protocol such as Group 3 Facsimile Protocol which is widely used for facsimile transmission.

Among the problems characteristic of earlier networks, was the lack of continuity of service. Thus, in many cases, the user client had to shut down his operation, since he needed to do a specialized communication operation in order to make use of voice transmission and FAX transmission. The present system eliminates any such need for delay or shutdown in order to handle telephone and FAX transmission. Further, the present system provides a means for communication between multi-users, together with a simpler and more expanded method for sending data to different types of appliances using different formats and operating under different protocols. This is handled by the Server 50, which provides specialized techniques, as will be discussed hereinafter, which permit a single originator to communicate to multiple different types of recipient terminal appliances. These terminal appliances include both telephone, FAX machines and E-Mail and User-PC clients operating on different protocols. These specialized features are provided for by the utilization of a specialized server having a controlled database manager 54 designated OSMOS where the protocol envelopes for handling document content are controlled by the server processes 52.

The Server module 50 provides a mechanism that enables secure communications to occur between the clients, such as 10, 20, 30, 33 etc., and the Server 50. It provides a database repository for all documents, together with the ability to index and search the documents with a powerful search engine. The search engine and its supporting database 58 uses the OSMOS 54 database manager to manage the storage, verification, and access to resident documents which include embedded graphics, sound clips, and video clips, as shown in FIG. 8.

As will be discussed hereinafter, the Server 50 includes a set of conversion filters (converters) which provide "On-The-Fly" conversion of documents authored in one specific format to be transformed into other formats for display, for printing, for E-Mail or voice or for FAX appliances. The server software "converts" an incoming document request into the appropriate format that is required by the "outgoing" client display device, whether it be a FAX appliance, a Hyper Text Mark-up Language Browser, a File Transfer Protocol Browser or a Hyper Text Transfer Protocol (HTTP) Browser 10 or voice for the telephone 80. Interactive Voice Response (IVR) software, is used to handle requests from standard telephones and HTTP (Hyper Text Transfer Protocol) software is used to deal with requests coming from the Internet.

Thus, the many problems and delays involved in older systems which required specialized handling in order to communicate between one client having one format and protocol and another client or appliance having a different format and protocol, are no longer the case with regard to the presently described system and the methodology used herein.

SUMMARY OF THE INVENTION

The present system and methodology provides for the origination and storage of a "source" file which is a designated "object" in an object-oriented database (OODB). Then the system provides another file designated as a "shadow" file. This shadow file does not have any content, but is dedicated to a particular output format. The shadow file merely "points" back to the first source file with certain "object-connecting" techniques called "relationships". The shadow also points to another "object" in the database, which is called a "converter". The converter is another "object" in the database and is dedicated to a particular output format. The converter will take the content of the source file and convert it into the desired format desired by the requester client.

Involved herein is a standard called a "MIME" standard, which is implemented into the database 58 of FIG. 1. MIME refers to "Multi-Purpose Internet Mail Extensions". This involves extensions to the SMTP format (Simple Mail Transfer Protocol), which is a messaging protocol used in TCP/IP networks (Transmission Control Protocol/Internet Protocol). This is a communications protocol used by the Department of Defense to internetwork dissimilar systems. It is basically a UNIX standard, but is supported on almost all computer systems. TCP/IP is the protocol used on the Internet.

Thus, when a User calls in and asks for a particular shadow file's content, the shadow file knows that it does not have this content, but that the system has been provided with a dedicated converter suitable for the shadow file's format. The converter then creates the compatible output format for the shadow file. The shadow file then streams this information back from the converter and returns it to the requesting caller or user, using a protocol selected by the Server processor 52.

Multiple numbers of shadow files and converters can be created in the database for each source file thus enabling the creation of multiple format outputs which are translated from the source file, when required.

Thus, the original information in the source file (which is copied to the database 58), can be selectively put through any one of a multiple number of shadow files and converters which will provide the properly formatted content to the requesting caller (with a protocol selected by the Server processor module 52) without any further delays or necessity on the part of the requesting caller to access other software operators.

Thus, a user or author who creates a single source file, can then access multiple ones of the shadow file and converter sets in order to provide multiple outputs in a format which can be made available to various types of receiving appliances operating on specialized formats and communication protocols.

DESCRIPTION OF THE PREFERRED EMBODIMENT

Figure 1:
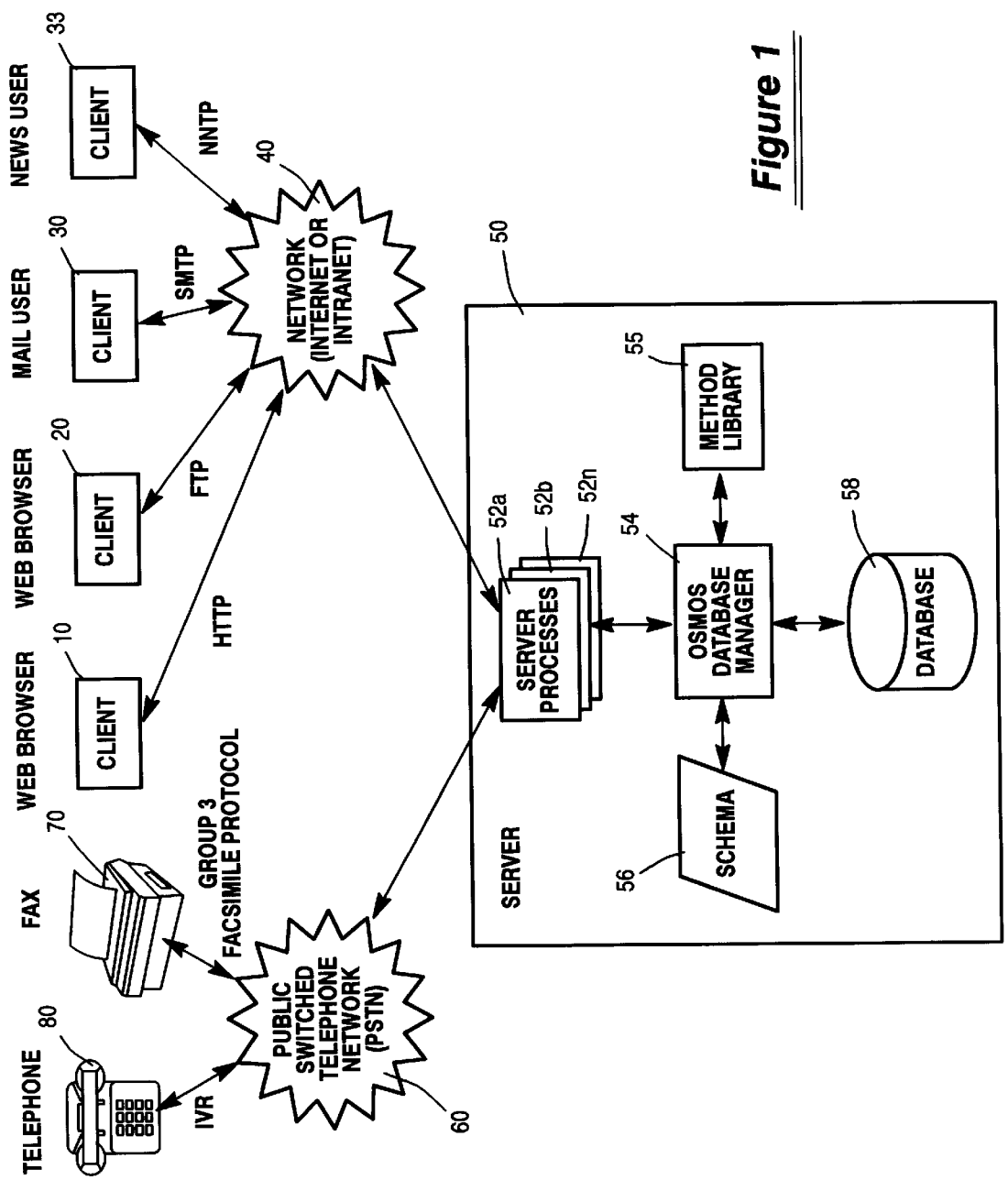
FIG. 1 is an overall network diagram showing the inter-related modules which function to utilize the methodology of the present system of automatic format conversion.

As earlier discussed regarding FIG. 1, a specialized Server 50 was connected to the network 40. The network 40 then had communication connections to the client 10, the client 20, the client 30 and the client 33, each of which involved different communication transfer protocols. Further, the Server 50 also had communication transfer connections to the Public Switched Telephone Network 60, which enabled communications to and from the FAX machine 70 with the Group 3 Facsimile protocol and with the Telephone 80 using Interactive Voice Response, IVR protocol.

The generalized problem faced by client users in this type of network is that a user will author or originate information in one particular format designated for various recipients but that the recipients may use different document formats for their appliances and may communicate with completely different protocols. For example, the author may use Microsoft Word format or SGML or HTML (Hyper Text Mark-up Language) which is a standard for defining Hyper Text links between documents and is a subset of SGML (which is the Standard Generalized Mark-up Language), or the author may select one of many other types of the different formats that are commonly used by various users in their personal computers.

As used herein, the term "format" refers to the specific arrangement of data on a disk or other storage media in order to meet the established application requirements. For example, a file can be stored in the format typical of a certain application, or it can be stored in a more generic format, such as plain ASCII text.

The term "protocol" as used herein refers to a set of formal rules describing how to transmit data, especially across a network. Low-level protocol defines the electrical and physical standards to be observed, such as bit-ordering and byte-ordering and the transmission and error detection and correction of the bit stream. High-level protocols deal with the data formatting, including the syntax of messages, the terminal-computer dialog, character sets, and sequencing of messages.

The term "Virtual File" as used herein refers to the situation that files stored in the database 58 are an image of real files stored in one of the clients 10, 20, 30, 33, etc. which are coupled to the network 40.

In the system shown in FIG. 1, a specific protocol is used as a means for accessing the server 50, and theoretically any type of format can be transmitted by use of any protocol. The server processes module software 52 performs the functions of servicing the various protocols received by or transmitted from the server 50.

With connections to the Internet, it is desirable to make the originally created information available in different formats. Normally, what was done was that the User-sender had to convert the content of his originated document format into a format which would be compatible with that of one particular intended recipient. Then, step by step, the User-sender had to change the document by reformatting it and he had to save it in each any one of the formats required for the various intended recipients. This provided a most inefficient and cumbersome job for the user. For example, the user had to convert his original document into the TIFF format if he was going to send it to a FAX machine, or he had to convert it into an audio format in order to convey it to a telephone appliance. Likewise, he had to convert an originated document to a mail message format in order to send E-Mail for conveyance to a recipient using E-Mail in his appliance.

As an example, let it be assumed that the User-author generates a document with content using the common universal format designated as RTF. This designates "Rich Text Format" which is a Microsoft standard for encoding formatted text and graphics. Now if the user wishes to send this document onto a FAX machine, it would be necessary to convert the RTF format into another format such as TIFF (Tag Information File Format), as indicated in FIG. 2A.

Figure 2A:
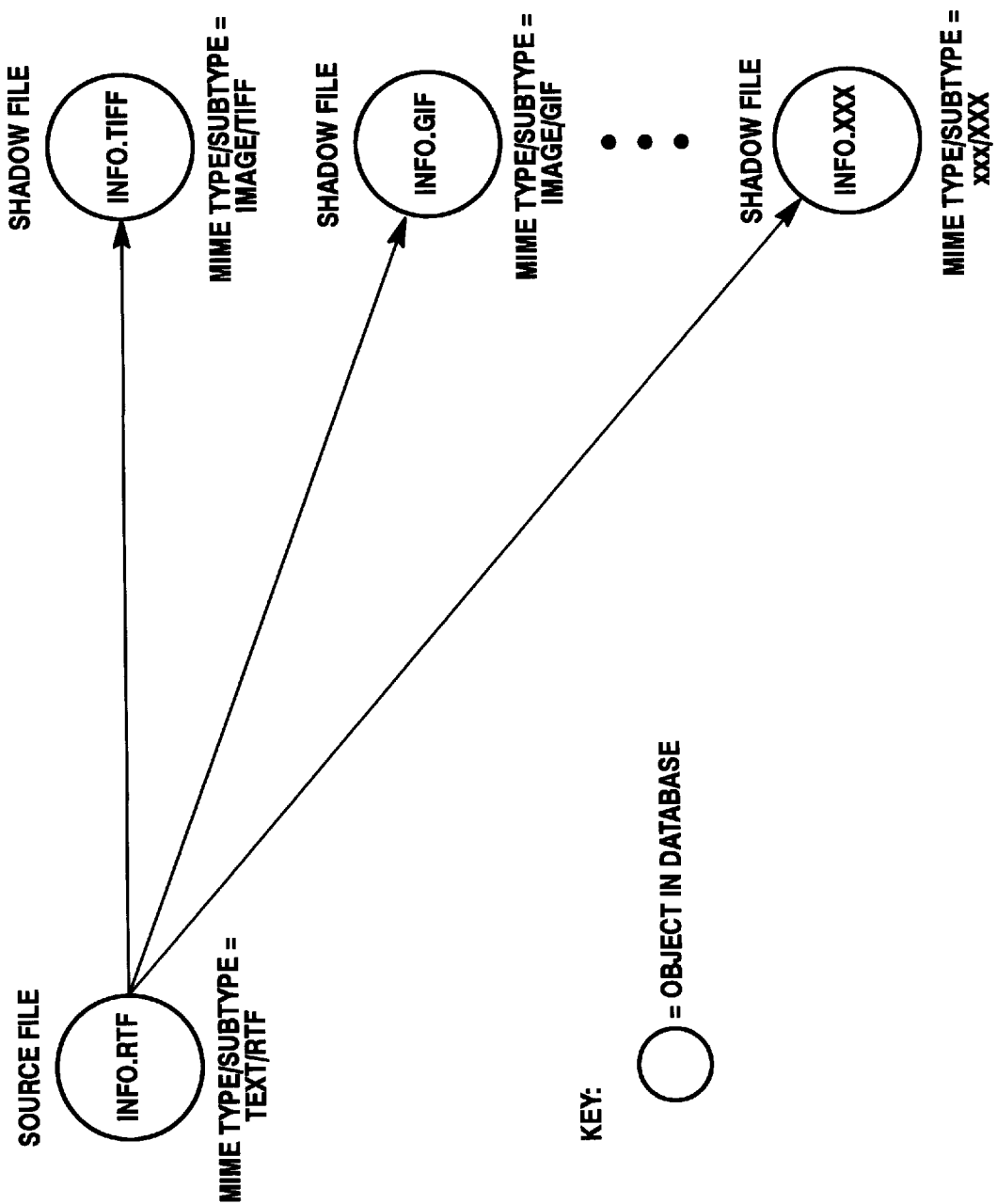
FIG. 2A is a drawing indicating a source file document, for example, shown in Rich Text Format (RTF) having been converted into the TIFF format for FAX communications and into the GIF format for picture or graphics display.

Likewise, if the User-author should desire to have a pure image of this document to appear on some recipient device, such as to display the text in order that it could be reviewed, the user might want to go to a graphics or picture format, such as GIF which denotes the Graphics Interchange Format, as seen in FIG. 2A.

In general, there are a large number of possible formats that the user may want to utilize.

The user in many cases, in wanting and desiring to change formats could often do the format change on a manual basis, but this would be excessively time-consuming. In the present system and methodology, the user can originate a document and have to do it only once in the format which is the most appropriate for him. Then, by using the present system, the user indicates the other formats he may want his document to be available in. In the present system, the user can use the system to create a source file and shadow file, and this source file document will then have an actual name such as "info.rtf" (FIG. 2A) which indicates that its associated shadow file represents a document which originated in the Rich Text Format, such as the Source File, S0, in FIG. 2B.

Further, the user may decide that he may want his original document which was in "rtf" to be available in other files, having different formats, and thus the present system allows him to create other shadow files which could be designated as "info.tiff" which would be intended for FAX machine recipient appliances and further, he could make another shadow file designated "info.gif" which would be destined for recipients who used the graphics interchange format or "GIF".

Now since there are many types of formats usable in computer networks, the user now has the option to use the present system to describe all of its possible future needs and thus he can utilize the database 58 in Server 50 in order to create many different types of shadow files which relate to each of the possible different formats that might be required.

Thus, the Server 50 of FIG. 1 has the capability of virtual storage of multiple numbers of shadow files, each of which can be said to be dedicated to a different document format.

Thus referring to FIG. 2A, it will be seen that the system can operate such that a created document which is a source file and which was set up in the Rich Text Format and designated "info.rtf" can eventually be utilized through the Server 50 as if it was available in the TIFF format (info.tiff) or was available in the GIF format (info.gif) or was available in multiple numbers of other formats (info.xxx).

Basically, it can be considered that various files are stored in the database 58 of FIG. 1, which reflect the various files shown in FIG. 2A, which include a file of the document in the TIFF format, a file of the document in GIF format or multiple numbers of other files in various different formats which might be desired for usability.

The database 58 is managed by a database manager designated as OSMOS 54 which is an object-oriented database. Thus, each of the files which represent each of the different document formats, are actual "objects" in the database, and these particular files can be called a "source" file which represent the original RTF document, but are now available, when called for, in each one of the individually different formats.

Figure 2B:
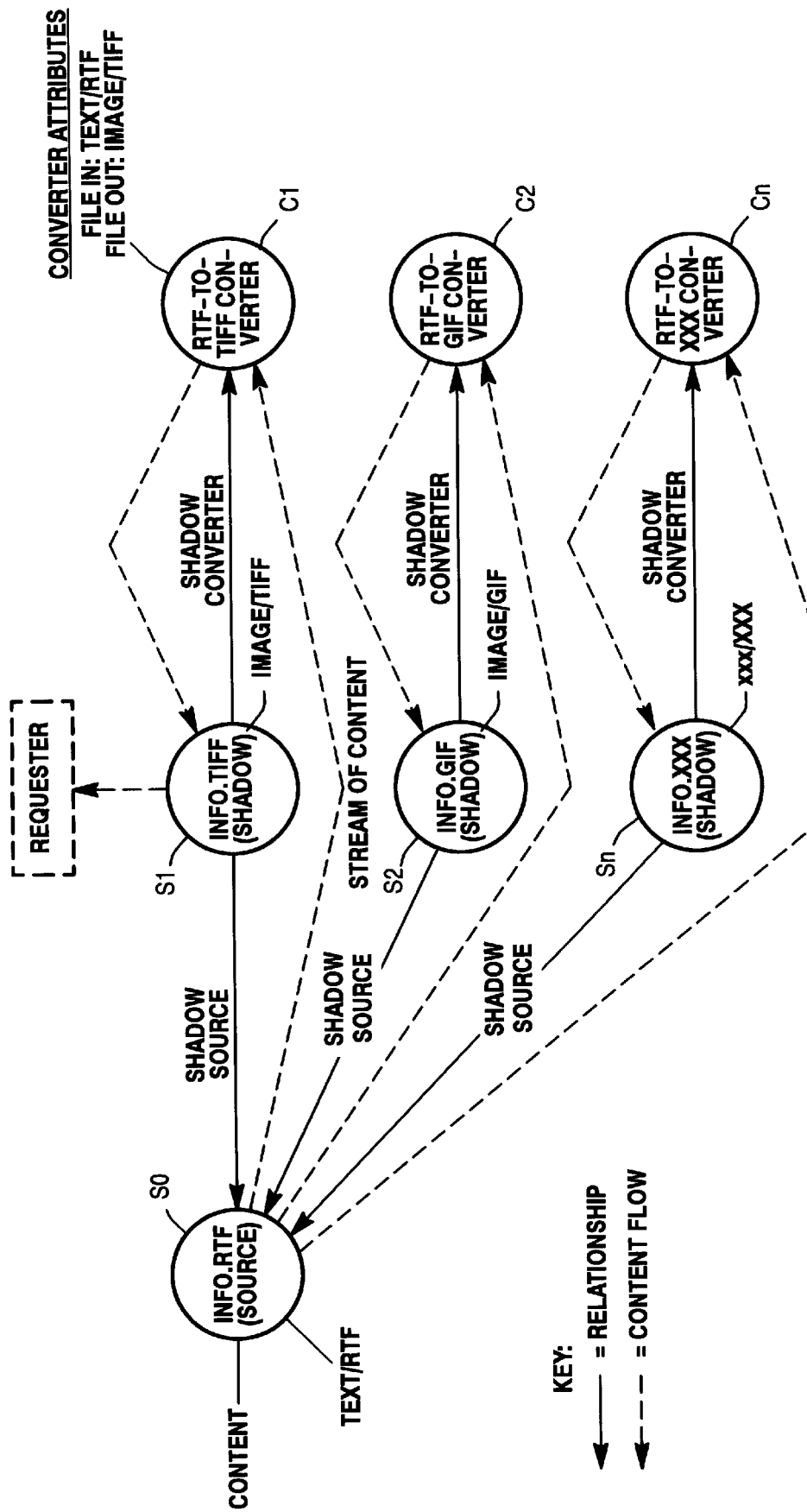
FIG. 2B is a drawing showing how the source file, after placement in the database is converted by the converter and sent to the shadow file, and wherein the converter can take in the content and MIME type for translation into an output for an image to be sent using a TIFF format for a FAX machine transmission.

Referring to FIG. 2B, it will be seen that the original database source file "S0", designated as "text/rtf" which is indicated as being in Rich Text Format (rtf), is existent as an "object" in the database 58. Then the system will be seen in FIG. 2B to have established a series of shadow files which are reflections of the original source document (info.rtf), and which are represented as objects in the database 58 for each different type of possible format that might be desired to be used or called for.

Thus, in FIG. 2B, the shadow file S1, represents a formatted document designated "image/tiff which is suitable for FAX appliances. The shadow file S2 represents an image format shown as "image/gif" suitable for graphic image format. Multiple numbers of these shadow files can be made to exist in the database 58, up to a file designated "Sn". It will be seen that each of the shadow files S1, S2 . . . Sn, each have a converter unit which is seen designated as C1, C2, . . . Cn, where each of these converters is also an "object" in the database 58. The shadow file does not have any actual content, but it points back to the database source file, together with object-connecting techniques called "relationships". Each shadow file also points to another "object" in the database which is called a "converter". Thus, each shadow file has a dedicated converter C. The Converter is another object that will actually take the source's content and convert it into the particular format that is desired. For example, C1 FIG. 2B will transform the input Text/rtf into an output as Image/tiff suitable for a FAX machine, enabling the shadow file to send the document to the requestor.

Also implemented into database 58 is a standard called "MIME" standard. The MIME is a standard designated as Multi-Purpose Internet Mail Extension. This provides extensions to the SMTP format, (which designates Simple Mail Transfer Protocol) which is a messaging protocol used in TCP/IP networks (Transmission Control Protocol/Internet Protocol). Additionally, every object in the database that has content, such as the source file, "S0", and the converters "C", will identify its particular MIME type. Thus, every object in database 58 that has content will include an identification of its particular MIME type.

The "objects" in the object-oriented database have properties which identify what they are capable of doing and the types of functionality that enable them to call and execute the behavior of a given object. The converters in FIG. 2B designated as "C" act to identify what they are capable of doing and the particular type of output that they will provide from the type of source that they are shadowed with. Thus converter C1 can take in the document text in rtf (format) and send out the document as an image in tiff (format).

Thus, it is only necessary for the user to call in and ask for a particular file by name. The shadow file S does not have the content, but is connected to a converter C. The shadow S calls on the Source, "S0", to pass the source content to the converter C. S0 in the system, the shadow Sn gets the content of the source file and streams it into the converter C. The converter C then creates the appropriate output so that, as seen in FIG. 2B, the original text/rtf (file-in) is fed out from the converter C1 as image/tiff (file-in) which is that the converter is saying "I can generate the image in TIFF". Likewise, the converter C1 on its input line, is saying "I can read the text/rtf file". Then the shadow file S1 will stream back the document and return it to the caller-requestor. Thus, the caller thinks that the shadow file is producing the content, but what is happening is that the content is being streamed from the source file, "S0", over to the converter, C1, and then to the shadow file, S1, which feeds it to the caller.

Once this is done, the converted content can be "saved" as a property of the shadow file so it does not have to be repeated since it is now made available within the shadow file "object" in the data base.

The multiple types of shadow files S1, S2 . . . Sn, in FIG. 2B, can provide for many types of conversions which are resident in the data base as objects. For example, it is possible to have an object in a database which is a mail message. This mail message may be desired to be made available as a "file" also. There can be a multiple number of messages in the database which are available in the proper format for many different user recipients. This message information may be desired to be available as "files" to all of the FTP clients, since FTP requires files whereas, ordinary mail would use messages.

The converters C are generalized so that their input can not only identify a MIME type, but can also identify a resource type (e.g., file or mail message) as well.

Figure 5:
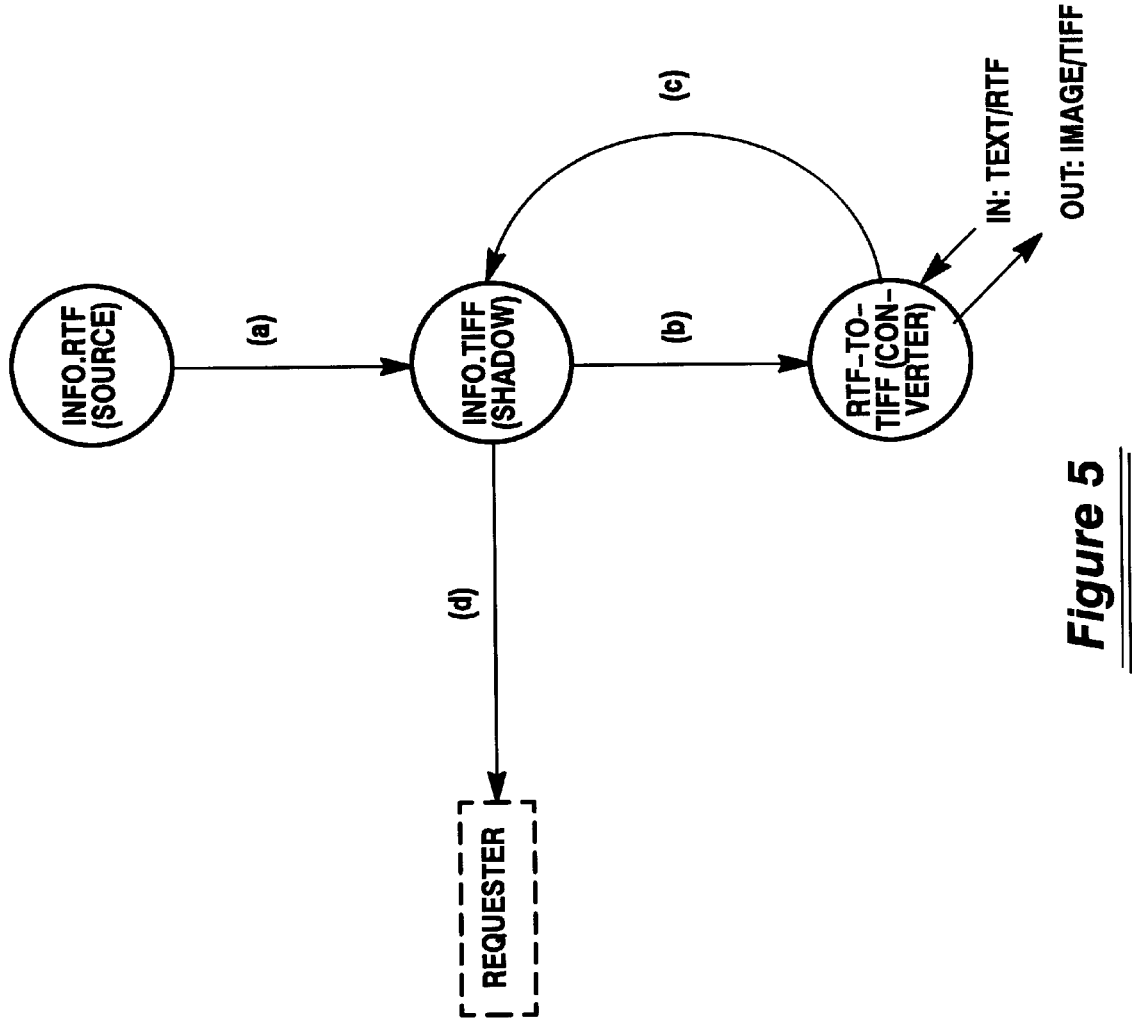
FIG. 5 is a state diagram showing a series of states occurring by which source file content is fed to the shadow file and converter where it is translated for release to the requestor.
Figure 6:
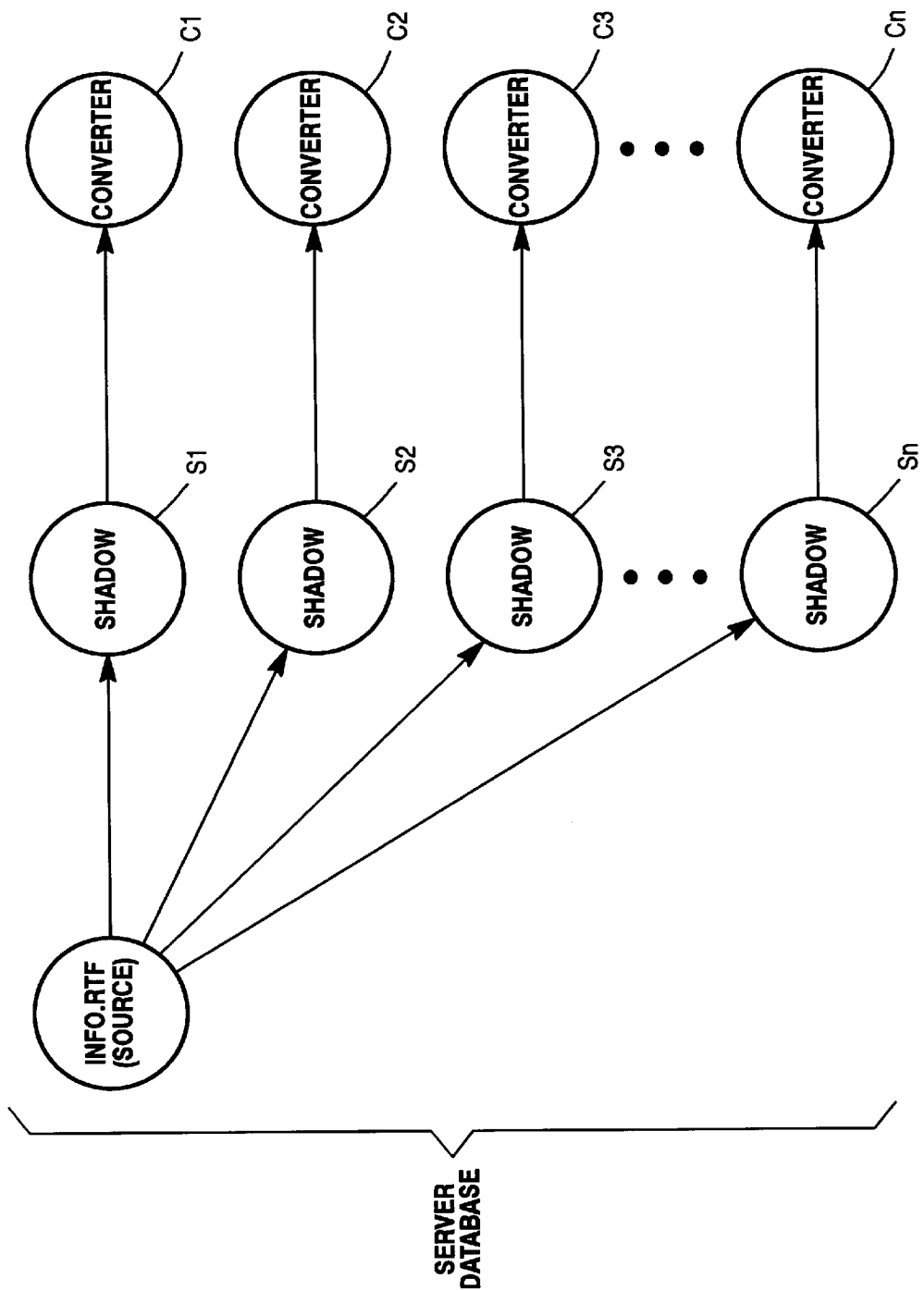
FIG. 6 is an illustration of how a single document in the server database can be related to multiple sets of shadow file-converters in order to provide the required different output formats as required by the requestor or requesters.

Thus as seen in FIG. 2B, FIG. 5 and FIG. 6, it is noted that the converter's input can not only identify a MIME type, but can identify a resource type (e.g., file or mail message) as well. Thus, the converter C1 uses a "file" as input and provides a file as output. The database 58 could be so designed so that the input could be a "message" and the output could then be a "file" or vice-versa. The database is provided with message-to-message converters, and there may be hundreds of converters involved. The system is "open" in that the user can add new converters into the database. Thus, there can be objects that know how to convert to many different types of formats.

Figure 2C:
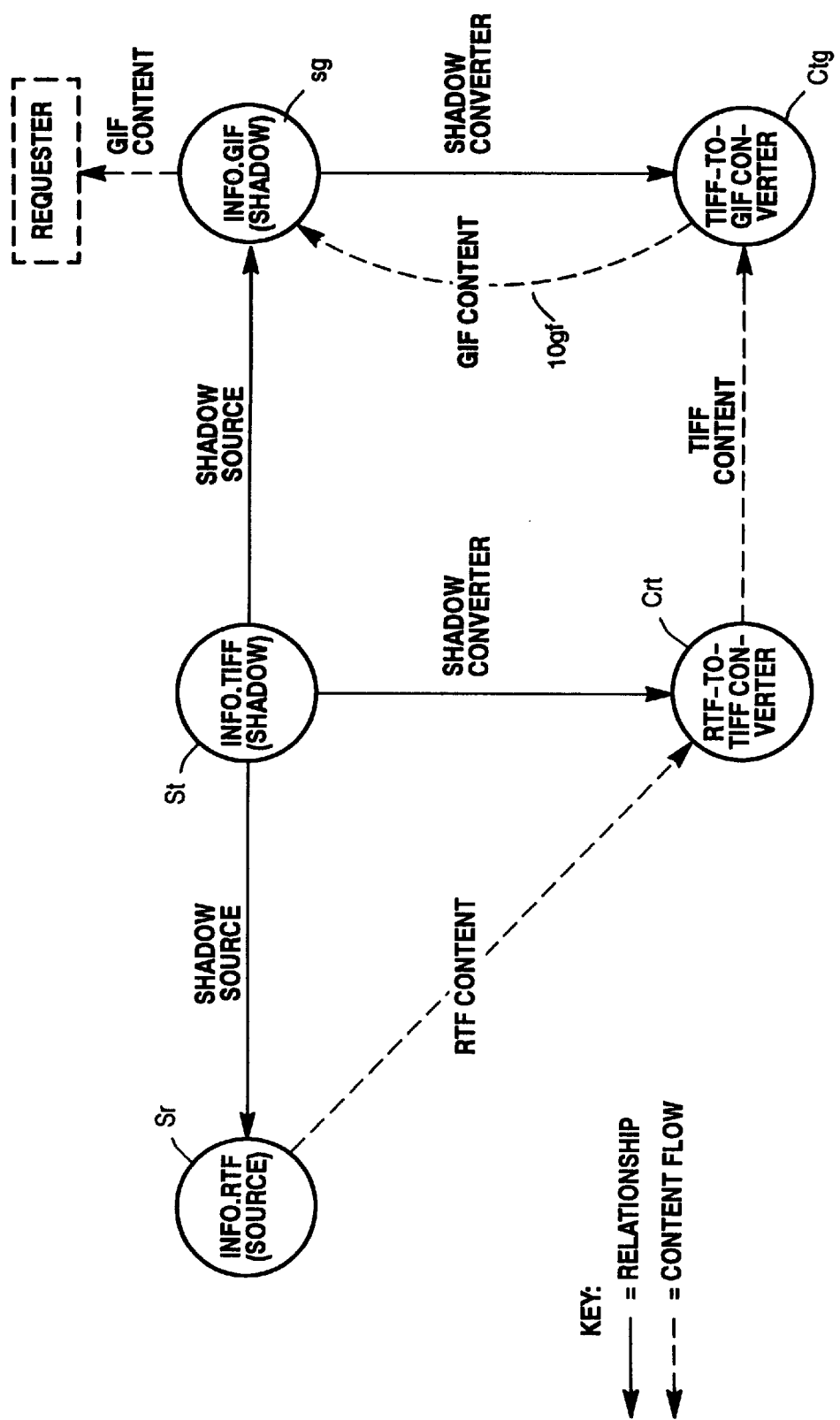
FIG. 2C is a drawing illustrating how a shadow file can use another shadow file as its source.

FIG. 2C is an illustration indicating how shadow files (in server database 58) may cooperate with each other in order to perform format conversions which might not be immediately available in the normal sequence. Thus in FIG. 2C, the solid line connections show relationships such that the shadow file St (tiff) can be a source to the shadow file Sg (gif) and the shadow file Sr (rtf), can be a source for the shadow file St (tiff).

As seen in FIG. 2C, the shadow file Sg (GIF) works in conjunction with the converter Ctg (TIFF-to-GIF). Likewise the shadow file St (TIFF) works in conjunction with the RTF-to-TIFF converter, Crt. It can now be seen that a particular shadow file can then utilize another shadow file as its source. This is useful, for example, when the "original" source file Sr (FIG. 2C) is in RTF format, but the desired output format is GIF—but then, at that time, there is no RTF-to-GIF converter presently available. However, observing the arrangement in FIG. 2C, there can be seen an "intermediate format," such as TIFF, which is available and into which the RTF (rich text format) can be converted, and from which GIF (graphical interface format) can be generated. Thus it can be seen that a two-level "piping path" can be set up in order to convert RTF format into the TIFF format via Crt and then subsequently into the GIF format via Ctg.

Thus the source file Sr in the rich text format (RTF) can initiate the converter Crt which will transform the format from rich text format (RTF) into the tagged image file format (TIFF). Then subsequently, the converter, Crt, can convey the TIFF format to the converter, Ctg, which will convert the TIFF into the GIF format (graphical interface format) which then can be conveyed on the line 10gf over to the shadow file Sg which can convey the formatted content (GIF) to the requestor.

The present system has extracted document content into existence as local objects in the database together with the "converter" object technique, thus enabling a user to author a file once, and then have the other shadow files (which are objects in the database) operate to make the original document content available in many different formats for publishing or being received by a variety of different types of digital appliances.

One of the advantages of using the database system is that it overcomes limitations of system files. If system files were used instead of a database system, there would not be enough hooks in the operating system to make it possible to make a file possess extended properties such as an explicit MIME type. Most operating systems have insufficient hooks to do that, so that it is really not necessary to store the information in files at all. It is much more flexible to store files as objects in the database, and then use the database interface to support standard protocols which support SMTP, HTTP, E-Mail, news, etc. Thus, the system is provided with standard software interfaces, and at the client user level, such as a Netscape Browser, the client cannot tell that the files he is getting are not really files, but only objects in the database.

Every file in the object database 58, whether a source file or a shadow file, has a unique file name, just as is done in the ordinary "real" file systems. Furthermore, each file has a precise MIME type/subtype designation such as text/plain or application/postscript. A description of the MIME designations are incorporated by reference herein in conjunction with the co-pending patent application U.S. Ser. No. 08/769, 199 entitled "A Method for Storing/Retrieving Files of Various Formats in an Object Database Using A Virtual Multimedia File System" which is included herein by reference.

Whenever a client-user wants the content of a file, he must send a command to the server 50 requesting the file, and the command must include or imply a file name. Sometimes when the client does not know what the file's MIME type/subtype is, he can often guess it based on the file's extension. For example, files that end with ". txt" are usually text/plain files. The kind of command required and how a file name is specified depends upon the protocol being used. In the HTTP protocol (Hyper Text Transfer Protocol), files are fetched with "Get" commands that must include a Uniform Resource Locator (URL). The File Transfer Protocol (FTP) also has a "Get" command which must include an absolute path name or a relative path name.

When a server process 52 receives a "Get" command, it determines which file is being sought and then finds the corresponding database object in the object database 58. If the object is found, the server process 52 calls that particular object's "Get Content" function to receive the file's content. The server process 52 does not know or care if the file is a source file or a shadow file. Due to the object paradigm which provides the useable functions, the object will know how to return its content. A source file object will have contents stored "inside" it, and hence, it's "Get Content" function will simply return that content.

A shadow file object always points to its source file and also to its converter object. Consequently, when the shadow file object's "Get Content" function is called, the object actually calls "Get Content" on its source file and passes the output to a "Transform" function within the converter object. The converter object's "Transform" function then returns the content in the new format, and the shadow file object's "Get Content" function returns that content as its result. The server process 52 does not know that all of this takes place, it simply receives the final result.

In summary, each source file and shadow file has its own name, and the client-user must request the file he wants by specifying the correct file name.

As an additional function, it is possible to permit a client user to request a file with a command that includes a desired MIME type/subtype, or a list of the MIME types/subtypes that the client-user can handle. Then subsequently, the virtual file can determine if its content is in a format that the client-user can handle. If this is not the case, the system can operate to dynamically find a converter object and then transform its content into a format that the client can handle. This feature could be called "Dynamic Format Selection" and it is a way to achieve dynamic content conversion without requiring a shadow file for every format that the client-user may desire. This feature is disclosed in a co-pending application U.S. Serial No. 08/768,386 entitled "Selective Multiple Protocol Transport and Dynamic Format Conversion in a Multi-User Network."

An option is provided to enable a shadow file to "save" a copy of its converted format. This is done by the author who creates the shadow file. Thus, when the author creates a shadow file, he has the option to specify if the shadow file should generate and keep a "copy" of its source file's transformed output immediately, or after the first access, or never, or only if the source file is so big that it would be useful to keep the transformed output. Thus, the shadow file can keep a copy of the transformed content, but this is not necessarily required. If a copy is kept, however, the copy is not another object but is simply kept "inside" the shadow file as a property.

In the situation where a shadow file keeps a copy of its source file's converted content, then an information triggering mechanism is used to notify the shadow file when the source context has been changed. Thus, when a source file's content is updated, the source file notifies all of its shadows that an update has occurred, and subsequently each shadow file is left with a decision of what to do about the change. The shadow file can then function to toss out its previously saved content or to immediately reconvert and save the new source file's content.

As discussed in regard to FIG. 2C where the chaining of multiple shadow files is found to be useful, this chaining is not normally done automatically, but must be arranged for by the author. The author must recognize that no conversion object is available that directly achieves the conversion that he wants and he must further recognize that he can achieve the desired conversion by chaining together a pair of presently available converters. Thus, the client-user could subsequently define each shadow file required to perform the assigned and appropriate converter objects.

In the present system, the shadow file/converter sets must be set-up "manually" by the author. This is generally necessary since some source file formats have numerous possible conversions to other formats, and the author probably only needs a source file to be available in a certain few other formats. Further, each shadow file requires a name, security attributes and other properties that the author must convey to the file.

The system could also provide a feature wherein a source file could be "automatically converted" to a desired format without requiring a shadow file. However, this would work only for protocols in which the client can request the desired format, as for example, HTTP (Hyper Text Transfer Protocol).

The present system provides for "automatic conversion" of formats to provide compatibility to a given user client. It should be understood that various different formats are also capable of being transmitted using different types of protocols. The concept of "resource type" could refer to different kinds of content type and a "resource" may be used to refer to a specific instance such as a specific file or message.

An image file, for example, could be stored in GIF (graphics interface format), or JPEG (joint photographic experts group) or in some other format. As an "object" in the database, this image file could consequently be accessed via several different protocols such as FTP (file transfer protocol) or HTTP (hyper text transfer protocol).

If the image file has a TIFF (tagged image file format) shadow file, this shadow file can also be accessed via different types of protocols. The presently described system has a conversion methodology which covers the conversion from one format to another format, for example, for conversion from GIF to TIFF. The issue of protocol transmission is developed in allowed co-pending application U.S. Ser. No. 08/768,386 entitled "Selective Multiple Protocol Transport and Format Conversion System for Multi-User Network." For example, if the source file content was originally stored via the file transfer protocol (FTP) and was later retrieved via the hyper text transaction protocol (HTTP), there would be no need for any conversion to have taken place.

The present system provides a "converter object" which exists for each unique conversion type. Thus, there could be one GIF-to-TIFF converter object and this converter object is used by all of the TIFF shadow files whose source file is GIF. However, the present system will allow multiple converter objects to exist that handle the same type of conversion but perform a slightly different function. For example, there could be two GIF-to-TIFF converters such that the first converter handles "color" GIF-to-color TIFF conversion, while the second converter handles color GIF to black-and-white TIFF conversion. Thus the same type of shadow file-converter sets may be used for different types of purposes.

There are two distinct phases or sets of processes involved in the presently described conversion technology. The first phase involves setting up the system, that is to say, creating the necessary objects in the database, and making them ready to do their conversion. The second phase is the "run" time, that is to say, to describe what is actually happening when the user says "get this file's content" and the subsequent chain of events. These could be said to involve a "Definition Phase" and a usability or "Access Phase". These involve the separate steps that the user-author goes through, wherein the user-author provides an information authored content in setting up the first part designated as the Definition Phase. The second, or Access Phase, involves a client or user on the Internet or in an Intranet, who desires to use the access capabilities of the second phase. In the second phase, the client-user would say "fetch me this document".

Figure 3:
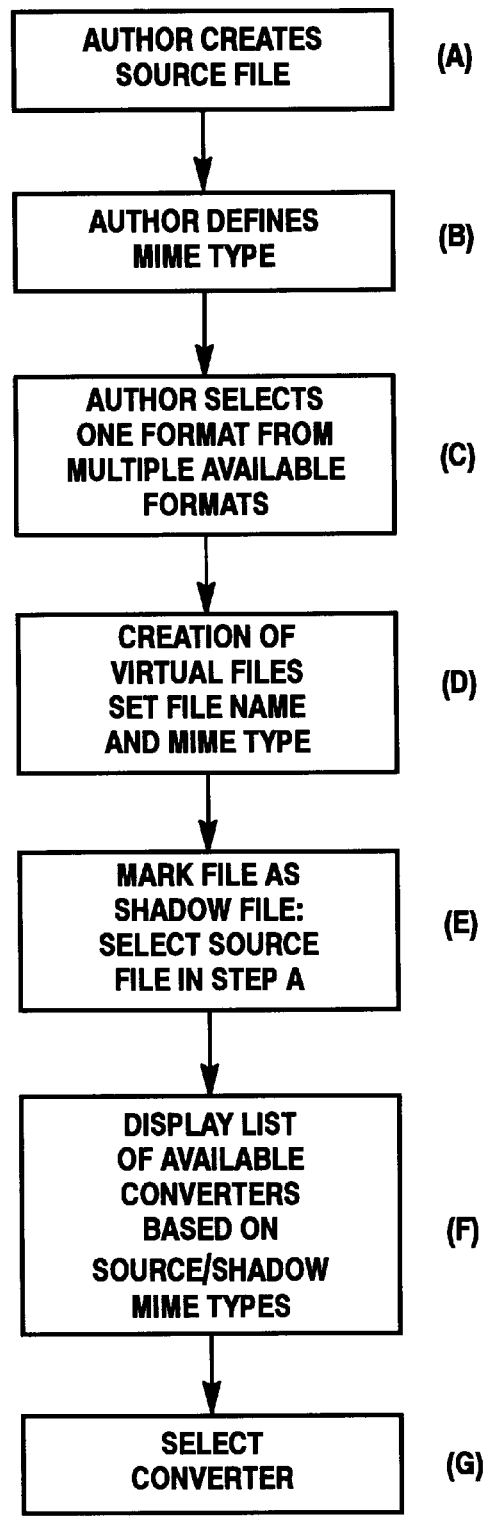
FIG. 3 is a flow chart illustrating the procedural steps used to define the system objects and operations for the selection of a particular converter object.

The steps involved in the Definition Phase are shown in FIG. 3 which involves how the author creates the file. The author creates a source file(in the database 58) which can be called the creation of a word document. Once he does that, the author wants to define that he is making this available in one or many alternate formats. For each alternate format, he creates a virtual file and that will give the file a file name and additionally, give the file a MIME type, plus other necessary details. As mentioned, MIME is the standard used to describe the content type.

A most important unit of information involved within the Server 50, is the "Virtual File". A Virtual File is analogous to a normal file because, logically, it has a name, file attributes (creation date, security, etc.) and also content (stream of bytes). However, the Virtual File is not stored as a system-level file, but it is represented as one or more "objects" within a content database, such as the database 58 of FIG. 1. These virtual files are managed within a software module known as the Virtual Multimedia File System (VMFS). A number of advantages occur with the use of the Virtual File abstraction, and these include:

(a) As a series of database objects, a Virtual File can possess additional information that a system-level file cannot. For example, the database can record more detailed information on the file's type, and enforce greater security control, and automatically manage the versions involved.

(b) As an abstract object, a virtual file's content can be represented in a large number of ways. For example, content can be stored as a stream of bytes, just like for normal files, or modeled as a network of semantic objects, or synthesized on-the-fly from dynamic parameters.

(c) As a database object, a Virtual File can possess encapsulated behavior which is used to process the file, that is to say, update it, retrieve it, display it, delete it, and so on.

(d) As a resident in the database 58, the Virtual File can be backed-up, recovered, or otherwise administered with content objects using a common set of tools and procedures.

(e) Although Virtual Files are abstract objects, they are based on a well-known file paradigm which allows them to be easily accessible via file-oriented protocols, such as programmatic Application Program Interfaces, APIs (open/read/write/close), File Transfer Protocol FTP, or mail attachments, to name a few.

The Virtual Files in the database 58 are primary editable resources. A client can create, update and retrieve information as files. The Virtual Files are also key access resources. Very often Web pages are represented as Virtual Files. The File Transfer Protocol, FTP, accesses information which is represented as Virtual Files. Interactive Voice Response, IVR, can provide source and object call flows which are stored and retrieved as Virtual Files.

Within the database 58, each Virtual File is represented as an "object" within a hierarchy whose classification reflects the file's purpose (which is largely a statement of the file's type). Each object type is defined as a class containing encapsulated operations which assist the creation, access, and management of corresponding objects. The virtual file object hierarchy, in concert with the methods that implement its operations, are designated as the VMFS to denote the Virtual Multimedia File System. The VMFS provides actualization for the "author once/publish many" system which provides for file conversion on-the-fly.

Figure 8:
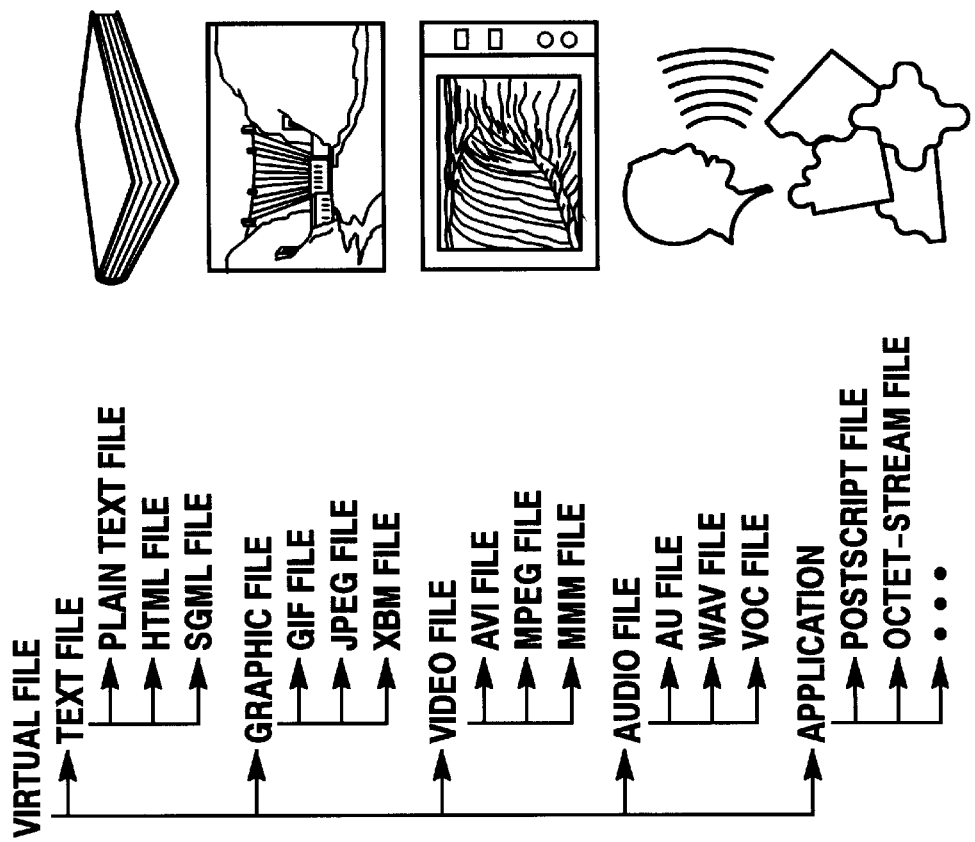
FIG. 8 is a taxonomy diagram indicating various types of Virtual File formats capable of storage in the database unit.

FIG. 8 is a drawing showing a typical Virtual File object hierarchy. Thus, the Virtual Files are divided into major file types, such as (i) text file, (ii) graphic file, (iii) video file (iv) audio file (v) miscellaneous. Each of these file types is divided into subtypes based on their purpose, their storage format or other criteria. Each object type inherits state and behavior from its parent object types and adds additional state and behavior for its own type.

The Virtual Files can be stored at the Server 50, and then independently verified, tested and released. Authors or originators, will most usually create a group of related files at one time and will consequently prefer to store, verify, test and release them together. Thus, the Server 50 supports the notion of a File Set, which is simply a named group of Virtual Files that can be managed as a whole.

The present system network provides interface functions which allow Users to create a "File Set" which includes both local files and/or Virtual Files which are already stored at the Server and can then verify or release the File Set as a whole. When a function is applied to a File Set (upload, verify, release), it is actually applied to each file in the File Set individually. However, the release function is performed as a single transaction so that the File Set is released as a whole or not at all.

There are various classes of object types which are resident in the database 58. Each object type will have certain particular characteristics. The Virtual Multimedia File System (VMFS) supports the presence of Virtual Files. The VMFS consists of an object hierarchy that specializes a generic Virtual File class into purpose-based subclasses. Each subclass inherits the generic state and behavior of its superclasses, and overrides behavior where a more specific method is required, plus it adds additional state and behavior as required by the subclass. Table I below is an illustration showing the class of object types resident in the database 58.

TABLE I

DATA BASE OBJECTS

| Object Type (class) | Object Characteristics |
| --- | --- |
| Virtual File | All files participate in this class; has common file attributes such as name, security, protocol accessibility, access functions, length, etc. |
| Text File | A text file is exported as a stream of "printable" characters, usually ASCII. |
| Plain | A text file with no particular formatting or syntax semantics. |
| SGML Document | A text file written as an SGML document; has additional SGML-oriented attributes such as DTD (Document Type Definition) describing element type, syntax, etc. (Standard Generalized Markup Language) |
| Postscript | An application file stored in the Postscript format; additional Postscript-oriented attributes such as Postscript level. |
| Call Flow Source | A text file written as an IVR call flow source file. (Interactive Voice Response) |
| Others | Other text file formats. |
| Graphic File | A file representing a graphical format; has additional operations such as get_as_GIF, get_as_JPEG, etc.; converted to required format as needed. |
| GIF File | A graphical file stored in GIF format. (Graphics Interchange Format) |
| JPEG File | A graphical file stored in JPEG format. (Joint Photographic Experts Group) |
| Others | Other graphic file formats. |
| Video File | A file representing video information, usually accompanied by an audio component. |
| AVI | A video file stored in AVI format. (Audio Visual Interleaved) |
| MPEG | A video file store in MPEG format. (Motion Picture Expert Group) |
| Others | Other video file formats. |
| Audio File | A file representing audio information; has additional operations such as get_as_WAV, get_as_AU, etc.; converted to required format as needed. |
| WAV | An audio file stored in WAV format. (Waveform Audio) |
| AU | An audio file stored in AU format. (common Audio file format) |
| Others | Other audit file formats. |
| Binary | A file representing an executable binary file (e.g., linked executable, shared object library, DLL, etc.) |

TABLE I-continued

DATA BASE OBJECTS

| Object Type (class) | Object Characteristics |
|---|---|
| Data | A file whose format is not Text nor binary, but represents some other special purpose (e.g., Call Flow Object, configuration file, etc.) |
| Others | Other Virtual File object types can be added as necessary. |

In addition to Virtual Files, another concept that is provided is the use of a "Virtual Message". Many of the Internet protocols supported by the Server 50 are message-based, such as News, E-Mail, IRC (Internet Relay Chat). This means that these services primarily receive and send information in terms of specific message types, such as news articles, E-Mail messages, and chat messages. The Server 50 supports Virtual Messages as an abstraction of the message paradigm. The advantages of Virtual Messages over the more traditional file-oriented messages are similar to those advantages for the Virtual Files, that is to say, they provide additional semantic description, encapsulated behavior and feasibility of common administration.

A Virtual Message is stored as an "object" within a hierarchy whose subclasses reflect the message's purpose. Additionally, the database manages several other hierarchies which help to organize and index messages. Examples of this are Message Boards which are specialized into bulletin boards, E-Mail folders, news groups, and chat rooms, in addition to Subscription Lists which are specialized into news group subscriptions, List Serve lists and chat participants and other types of miscellaneous classes which manage last-read pointers, object ownership, and object access privileges.

The Virtual Message System VMS, thus consists of a set of object hierarchies that provide classes which represent abstract messaging concepts, such as messages, message boards, Subscription Lists, etc., in addition to subclasses that specialize these for special purposes such as E-Mail, news, and IRC. A typical VMS (Virtual Message System) class hierarchy is shown hereinbelow in Table II.

TABLE II

VIRTUAL MESSAGE SYSTEM CLASS HIERARCHY

| Object Type (class) | Object Characteristics |
|---|---|
| Message Board | All message containers are members of this class; has common file attributes such as name, security, owner, etc.; has head/tail/next pointers for message thread management. |
| E-Mail Folder | A folder for E-Mail messages. All Users having E-Mail at a Virtual Host will minimally have an "inbox" folder. Users keeping mail at the Server (instead of or in addition to their workstation) may have additional folders as well. |
| News Group | A folder for news articles. |
| Chat Transcript | A saved (active or archived) IRC transcript. (Internet Relay Chat) |
| Message | All messages participate in this class; has common attributes such as subject, date/time submitted, submitter ("from" User), and message body. |
| E-Mail Message | An E-Mail message; has additional attributes such as "to", "cc", and optional E-Mail headers. |
| News Article | A news group article. |

TABLE II-continued

VIRTUAL MESSAGE SYSTEM CLASS HIERARCHY

| Object Type (class) | Object Characteristics |
|---|---|
| Chat Message | An accepted (non-rejected) chat message. |
| Subscription List | A list of Users who subscribe to a particular Message Board. Has common attributes such as Message Board pointer and subscriber list. Subscribers can be E-Mail addresses and/or COM.unity Users. |

When the author creates a source file, he also sets up the MIME type. The content of the file can be text, images, graphics and so forth. Thus, as seen in FIG. 3, at step A, the author creates the source file. Then, at step B, the author defines the MIME type. At step C, the author selects one format from the multiple number of available formats. At step D, the author creates a virtual file and sets a file name and MIME type for the file, then at step E, he marks the file as a shadow file which selects the source file which was created at step A.

Thus as seen for example in FIG. 2B, the author creates the shadow file "S1", and sets the MIME type to be image/TIFF so that he now has a "tiff" file for faxing purposes. Then the author picks the source file involved from which the system knows the source MIME type.

The database 58 can be searched for all the converters that are available and where each converter can describe itself since it exists as an object in the database. For example, an object will say "I am capable of converting text.rtf into image/tiff, for example. Then of course, there could be multiple converters C, and the user has a display list (F) FIG. 3 of these available converters where he then has to pick (G), the one which he desires to use. After he has picked his converter at G, FIG. 3, he has provided all the information needed.

Thus, in the Definition Phase of FIG. 3, there are provided shadow files which point to the source and also are connected to the converter, which is an object which has its input and output properties. These objects reside in the database 58 and are ready to be accessed. Thus in FIG. 3 at step F, the system can display a list of available converters based on the source/shadow MIME types and at step G, the author or a User can select a particular converter.

Figure 4:
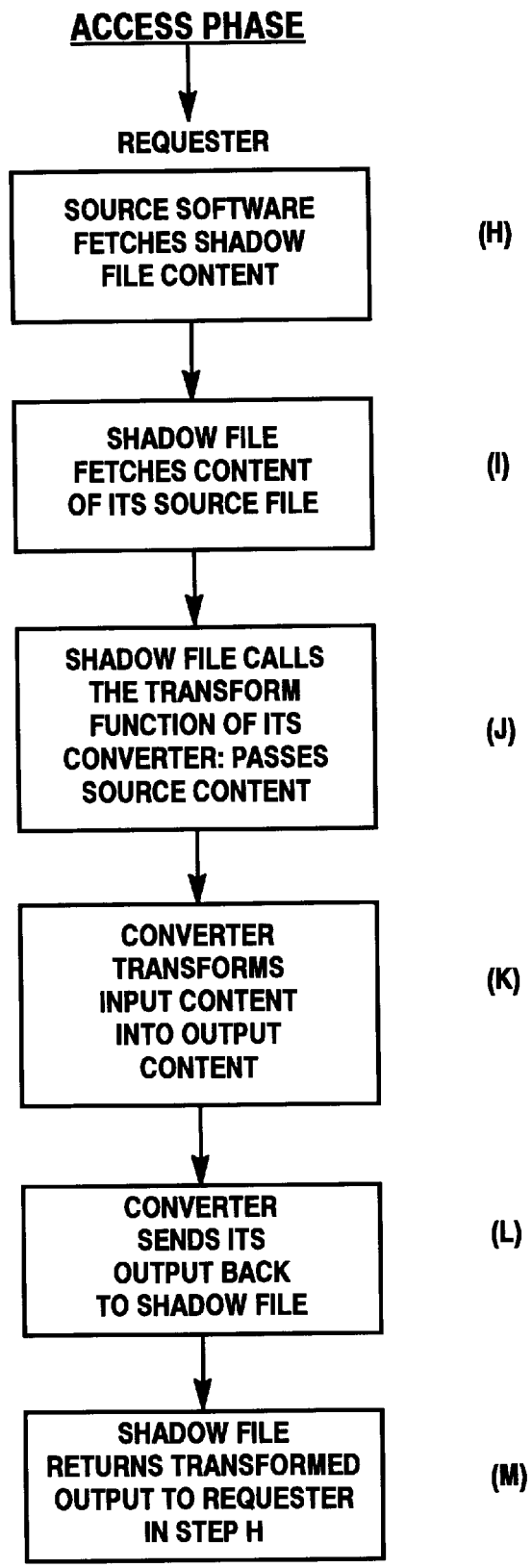
FIG. 4 is a flow diagram showing the series of steps whereby the source or client-requestor software fetches the shadow file content with the use of a converter to return the proper formatted data to the requester.

The Access Phase of the software operation is shown in FIG. 4. A User, client or requestor desires to fetch the content of the shadow file. The requestor starts the process by asking "give me the content of this shadow file". Step H of FIG. 4 indicates the requestor asking for the content of the file and the source software fetching the shadow file content. In actuality, the shadow file fetches the content of its source file. At step I, the shadow file then fetches the content of its source file and then at step J, calls on the transformation function of its converter, where at step K the converter transforms the input content into an output content and at step L, the converter sends its output back to the shadow file, where at step M, the shadow file returns the transformed output back to the requestor in step H. Thus, the shadow file, which has a copy of the transformed converter object's output, then returns it back to the requestor.

As was indicated in FIG. 2B, for example, the source file "S0" streams its content to the converter C1, which then strings it back to the shadow file "S1", and the shadow file strings it over to the requestor who initiated the original action.

The above operations are accomplished with object-oriented database technology, where each of the items such as the source, the shadow file and the converter, are all "objects" in the database. The "converter C" is designed as a very general purpose object, in that it can handle the source as a file, but can also handle the source as a "message" item. When the converter strings the output back, it can be delivered in many different formats.

FIG. 5 is a simplified drawing showing the basic steps involved for a requestor to receive a document or information in a desired format. Here, the source file and MIME type is conveyed at step (a) to the shadow file which has its own MIME type. The shadow file at step (b) provides the information to the converter, then the converter at step (c) provides the information back to the shadow, which then outputs, at step (d), the required format to the requestor of the original source document.

FIG. 6 is a schematic drawing showing how a document designated as a generality as "info.doc" resides in server database and how this document can be related to multiple numbers of different shadow files, "S" which also reside as objects in the database. Further, each shadow file in the database has its own personal converter "C" which resides in the database and which is available for transforming the original document "info.doc" from its original format into any one of a number of other desired formats. In FIG. 6, the info.doc is shown specifically indicated as INFO.RTF (Rich Text Format) as an example of one format.

Figure 7:
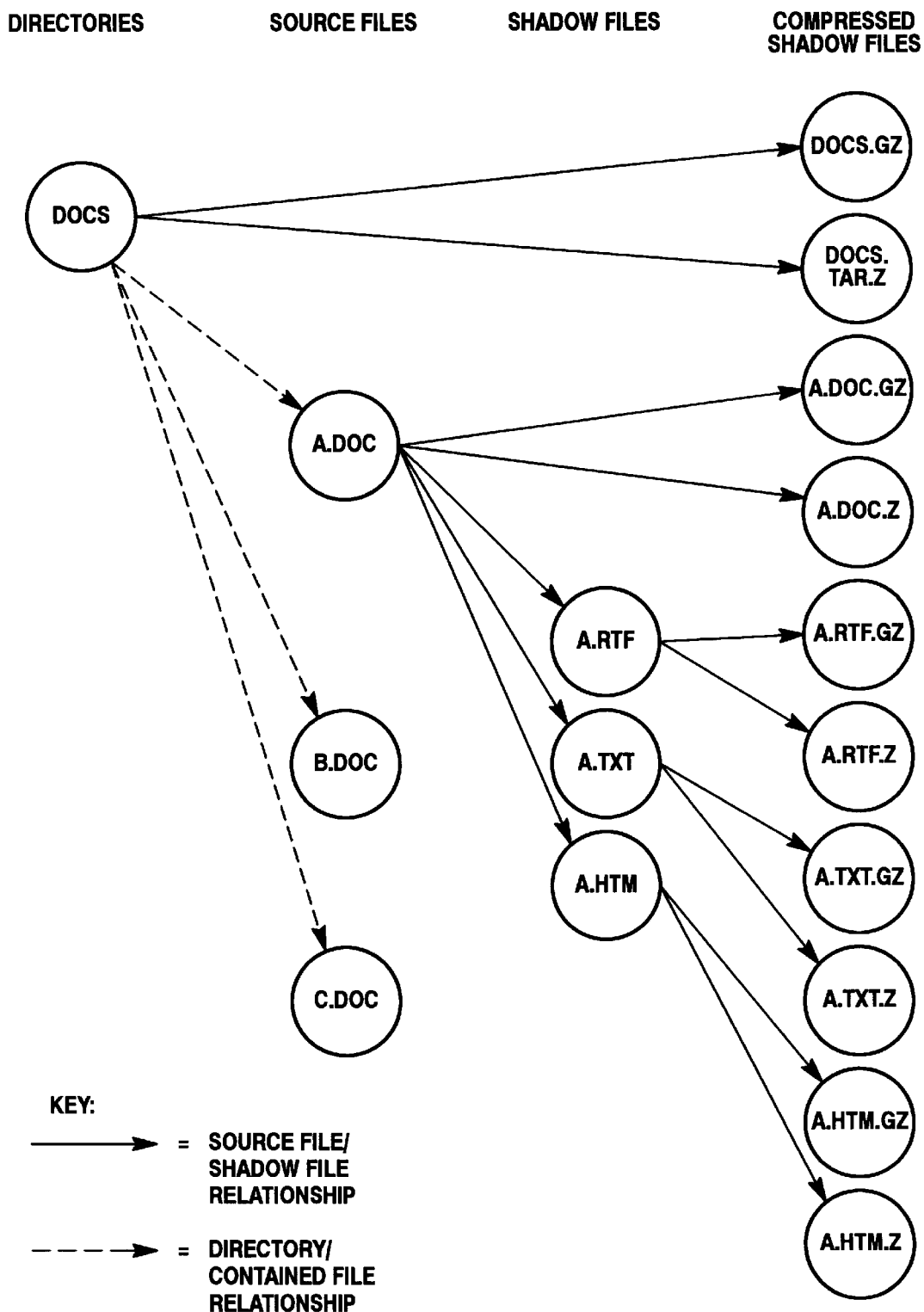
FIG. 7 is a drawing showing how various documents in different formats can be shadowed in different compressed and non-compressed formats, and how a file directory can be utilized as an object and shadowed by various file objects.

Referring to FIG. 7, this figure demonstrates two concepts: (1) how a directory can be shadowed as a compressed file using a directory-to-directory file converter, and (2) how a source file can be shadowed in multiple ways to create both compressed and noncompressed alternate formats.

As shown, a Virtual File directory called "docs" exists, which is a logical folder into which other Virtual Files can be stored. The docs directory contains three "content" files: a.doc, b.doc, and c.doc. The docs directory is also the source file for two shadow files: docs.gz and docs.tar.Z. The docs.gz file represents a compressed file in the "gnu zip" format. The docs.tar.Z file represents an "archive" file in "tar" (Tape ARchive) format which has been compressed with the UNIX standard compress format. When a shadow file's source is a directory, it will point to a special converter object of type "directory-to-file" (not shown). When such a shadow file's content is fetched by a Requester, the shadow file calls the transform function of its converter object, passing its source directory file as a parameter. The converter object will typically fetch the content of some or all files within the given source directory and combine and/or compress their content according to its represented compression technique. This combined and/or compressed content is returned to the shadow file, which returns it to the Requester. Since a directory-to-file converter performs its multi-file compression each time its transform function is called, a shadow file using a converter will always appear to have "current" content when the shadowed directory is updated in some manner. For example, if a new file is added to the directory (say "d.doc"), all shadow files for the directory (docs.gz and docs.tar.Z) will automatically include this file the next time they are fetched by a Requester, without any manual update required to the shadow file or its converter.

As also shown in FIG. 7, a "content" file can be shadowed by files that represent compressed formats. For example, a.doc is shadowed by a.doc.gz and a.doc.Z, each of which represent the content of a.doc in the same basic format, but compressed with different compression techniques.

Also shown in FIG. 7 is the fact that a shadow file can be the source for one or more secondary shadow files which represent various compressed formats. For example, a.doc is shadowed by a.rtf, a.txt, and a.htm, each of which represents an alternate format for a.doc. Each of these shadow files is further shadowed by two secondary shadow files, each of which represents a different compression technique. For example, a.rtf is shadowed by a.rtf.gz and a.rtf.Z, which represent the content of a.rtf but in different compressed formats. In this way, an original "content" file can be offered in a wide range of alternate compressed and non-compressed formats. In FIG. 7, a.doc is offered in 11 alternate formats in addition to its original authored format.

The conversion technology is based on a high-level object concept, so that much more can be done, rather than just file conversion.

For example, referring to FIG. 1 and starting with the network using the Internet or an Intranet, there are a number of clients indicated. Such a client could be a Web Browser commonly known as a "surfer". The protocol he uses may be HTTP. However, various browsers support many different protocols. Thus, intercommunication can be easily facilitated since the server processes 52 in the server 50 can communicate to the OSMOS database management software 54 and to the database 58. Every object or item that is desired to be stored in the database 58 has to be described within the OSMOS database manager 54. The description of the objects to be handled by the database manager 54 is provided by the Schema software 56, which defines what functions will be supported and what converter objects and transformations can be handled by the manager S4 and the database 58.

Now, any client-module in FIG. 1 such as 10, 20, 30, 33, 70, 80, can call the Server 50 to access an original Source file which may be in RTF (Rich Text Format) and receive the document in the proper compatible format suitable to the client-module whether it be in RTF, GIF, TIFF, IVR or any one of the other formats used by client-modules.

Described herein has been a multi-user network where multiple client modules operating with different protocols may receive an original source document in the properly compatible format for that receiving client module. Further, a User has the capability of authoring a single Source document and publishing it to multiple receiver appliances, each of which will receive it with the appropriate format and carried with the appropriate protocol.

While other embodiments of the described concept may be implemented for similar purposes, the present network and methodology is encompassed by the following claims.

What is claimed is:

1. In a network having multiple sending-receiving appliances each having different format requirements and operating protocols, wherein said network is supported by a Server using an object database, a method for enabling any one of said appliances to communicate with any other of said appliances comprising the steps of:

(a) establishing a source file in a first format as an object in said database;

(b) establishing, as a database object, a shadow file dedicated to each format used by the appliances connected to the network;

(c) establishing, as a database object, a converter for each shadow file, said converter functioning to transform said source file into the particular format of its dedicated shadow file;

(d) creating said database objects of source file, shadow file and converter as a virtual file system using MIME (Multi-Dumose Internet Mail Extension) types and subtypes;

(e) enabling any User to set up a source file in said database;

(f) enabling any appliance in the network to access a copy of said source file in a format suitable for the receiving appliance.

2. The method of claim 1 which includes the steps of:

(f) authoring, by a User-Sender, of a source file in said first format as an object in said database;

(g) establishing a hierarchical organization of resource objects which include:
   (i) a virtual file converter object utilizing a MIME format which provides multiple sub-objects;
   (ii) a virtual message object Providing virtual message sub-objects;
   (iii) a message board object providing virtual message sub-objects;
   (iv) a class of shadow file-converter objects which provide file converter objects, message converter objects each having sub-objects which translate files between each of them;

(h) running a sequence of operations whereby a plurality of said established shadow files and converters provide a compatible format for each appliance in the network to receive a copy of said authored source file;

(i) delivering a copy of said source file in a compatible format to each one of said receiving appliances.

3. In a network having multiple sending-receiving appliances and supporting multiple User-clients where each User-client utilizes a computer terminal serviced by a client-server module with an object database, a method for enabling a User-client to create a single document in a first format and to publish said document in different formats compatible to other computer terminals and receiving appliances, comprising the steps of:

(a) creating an original source document in a first format within the User-client's computer terminal;

(b) transmitting the content of said original source document for storage as an object in said object database;

(c) populating said database with discreet objects as virtual files designated as a source file, a shadow file and a converter for each type of output format required for each terminal or appliance connected to said network or said server;

(d) utilizing a dynamic format conversion search and transformation means for locating the appropriate converter objects in said database and to utilize their format transformation functions to provide compatible formats for transmission to each one of said receiving appliances and client-Users, together with a protocol compatible to the said appliances and users.

4. A system for supporting multiple User-clients, each utilizing a computer terminal, and for enabling network appliances, oriented to different operating formats, to communicate with one another automatically without user intervention, said system comprising:

(a) a plurality of inter-connected appliances in a network including:
   (a1) a plurality of User-client computer terminals connected to a content server means wherein each said computer terminal can originate a source document to a content server means or receive the content of a document from said server means;
   (a2) a plurality of communication terminals including telephones and FAX machines connected to said content server means;

(b) said content server means for holding the content of document files in an object database which is an organized hierarchy of database objects which define the document content via a virtual file object, said virtual file object utilizing the MIME format to communicate with multiple subsets of file objects, and including:
   (i) means to receive and hold the contents of an original source document in a first format received from said computer terminals and communication terminals;
   (ii) means to set up a shadow file-converter set for each operating format required by each of the said computer and communication terminals;
   (iii) means to receive call-requests, from said User-client's computer terminals, for the content of selected document files;
   (iv) means to transmit an output format, converted from said first format, which supplies the needed operational format for the receiving appliance which initiated the call request.

5. The system of claim 4 wherein said User-client computer terminal includes:

(a) means for said User-client to author an original document for placement as an object in said object database;

(b) means to distribute and publish the contents of said original document to all of the appliances in said network.

6. The system of claim 4 which includes:

(i) means to notify a shadow file that the contents of an original source document has been changed;

(ii) means in said notified shadow file to remove its access to contents at the original source document and replace this with access to the contents of the changed document.

* * * * *